(12) United States Patent
Cockerill

(10) Patent No.: US 10,072,567 B2
(45) Date of Patent: Sep. 11, 2018

(54) LINEAR ELECTRICAL MACHINE/GENERATOR WITH SEGMENTED STATOR FOR FREE PISTON ENGINE GENERATOR

(71) Applicant: Libertine FPE Ltd., Yorkshire (GB)

(72) Inventor: Samuel Edward Cockerill, Yorkshire (GB)

(73) Assignee: Libertine FPE LTD., York (GB)

( * ) Notice: Subject to any disclaimer, the term of this patent is extended or adjusted under 35 U.S.C. 154(b) by 576 days.

(21) Appl. No.: 14/372,136

(22) PCT Filed: Jan. 18, 2013

(86) PCT No.: PCT/GB2013/050106
§ 371 (c)(1),
(2) Date: Jul. 14, 2014

(87) PCT Pub. No.: WO2013/108034
PCT Pub. Date: Jul. 25, 2013

(65) Prior Publication Data
US 2015/0001852 A1    Jan. 1, 2015

(30) Foreign Application Priority Data
Jan. 19, 2012 (GB) .................................. 1200889.2

(51) Int. Cl.
*F02B 71/06* (2006.01)
*F02B 71/04* (2006.01)
(Continued)

(52) U.S. Cl.
CPC ............ *F02B 71/06* (2013.01); *F02B 63/041* (2013.01); *F02B 71/04* (2013.01); *H02K 5/04* (2013.01);
(Continued)

(58) Field of Classification Search
CPC . F02F 3/00; F02F 3/0084; F02B 71/04; F02B 71/06; F02B 63/041; H02K 7/1869; H02K 7/1884; H02K 7/1876
(Continued)

(56) References Cited

U.S. PATENT DOCUMENTS 4,454,426 A * 6/1984 Benson ................. F02G 1/0435
290/1 R
4,541,787 A * 9/1985 DeLong ................ F04B 17/046
310/35

(Continued)

FOREIGN PATENT DOCUMENTS

JP   53-067181   11/1979
JP   57-17366    10/1982
(Continued)

OTHER PUBLICATIONS

Somaloy® Technology for Electric Motors dating Mar. 2011.*
(Continued)

*Primary Examiner* — Bernard Rojas
*Assistant Examiner* — Maged Almawri
(74) *Attorney, Agent, or Firm* — Andrus Intellectual Property Law, LLP

(57) ABSTRACT

A linear electrical machine comprising a movable piston, an axially segmented cylinder having least one magnetically permeable segment and a bore configured to allow the piston to move within the cylinder, a cylinder housing having a bore for receiving the segmented cylinder, and means for securing the segmented cylinder in place within the cylinder housing. This arrangement permits the construction of it free piston engine linear with improved piston position control, more consistent combustion and improved electrical conversion efficiency.

20 Claims, 19 Drawing Sheets

(51) Int. Cl.
  *H02K 35/00* (2006.01)
  *H02K 7/18* (2006.01)
  *H02K 15/02* (2006.01)
  *F02B 63/04* (2006.01)
  *H02K 5/04* (2006.01)
  *H02K 5/20* (2006.01)
  *H02K 33/12* (2006.01)
  *H02K 35/02* (2006.01)
  *H02K 5/18* (2006.01)
  *H02K 9/20* (2006.01)
  *H02K 1/18* (2006.01)

(52) U.S. Cl.
  CPC ............. *H02K 5/20* (2013.01); *H02K 7/1884* (2013.01); *H02K 15/02* (2013.01); *H02K 33/12* (2013.01); *H02K 35/00* (2013.01); *H02K 35/02* (2013.01); *H02K 1/185* (2013.01); *H02K 5/18* (2013.01); *H02K 9/20* (2013.01); *Y10T 29/49009* (2015.01)

(58) Field of Classification Search
  USPC ........... 310/30, 15, 14, 12.17, 35, 34, 12.23, 310/12.12; 417/11, 56, 258, 398–403
  See application file for complete search history.

(56) References Cited

U.S. PATENT DOCUMENTS

| | | | | |
|---|---|---|---|---|
| 4,692,673 | A * | 9/1987 | DeLong | H02K 41/02 310/17 |
| 5,734,209 | A * | 3/1998 | Hallidy | E21B 43/128 310/12.04 |
| 5,831,353 | A * | 11/1998 | Bolding | F04B 17/046 310/12.15 |
| 6,323,567 | B1 * | 11/2001 | Hazelton | H02K 9/19 310/12.29 |
| 6,748,907 | B2 * | 6/2004 | Malmquist | B60K 6/46 123/46 E |
| 7,201,746 | B2 * | 4/2007 | Olsen | A61M 5/14276 604/288.01 |
| 7,318,506 | B1 * | 1/2008 | Meic | F02B 63/04 123/46 R |
| 7,378,765 | B2 * | 5/2008 | Iwasa | H02K 33/00 310/14 |
| 2001/0033110 | A1 * | 10/2001 | Pulford, Jr. | H02K 15/03 310/12.17 |
| 2003/0024492 | A1 * | 2/2003 | Malmquist | B60K 6/46 123/46 E |
| 2003/0034697 | A1 * | 2/2003 | Goldner | B60G 17/0157 310/17 |
| 2005/0081804 | A1 * | 4/2005 | Graf | B60K 6/24 123/46 E |
| 2005/0162034 | A1 * | 7/2005 | Soghomonian | H01F 1/1475 310/216.001 |
| 2010/0117373 | A1 | 5/2010 | Mochida et al. | |
| 2010/0263765 | A1 * | 10/2010 | Spangenberg | C23C 8/02 148/211 |
| 2010/0277012 | A1 * | 11/2010 | Kobayashi | B60K 6/24 310/30 |
| 2011/0025138 | A1 | 2/2011 | Chao et al. | |
| 2012/0175974 | A1 * | 7/2012 | Robertson | H01F 7/1646 310/12.26 |

FOREIGN PATENT DOCUMENTS

| | | |
|---|---|---|
| JP | 60-155666 | 8/1985 |
| JP | 11-031612 | 2/1991 |
| JP | 03-293955 | 12/1991 |
| JP | 2001-118725 | 4/2001 |
| JP | 2002-511130 | 9/2002 |
| JP | 2003-518358 | 6/2003 |
| JP | 2004-007868 | 1/2004 |
| JP | 2004-225570 | 8/2004 |
| JP | 2005-136164 | 5/2005 |
| JP | 2005136164 | * 5/2005 |
| JP | 2005-524016 | 8/2005 |
| JP | 2007-527686 | 9/2007 |
| JP | 2007-305865 | 11/2007 |
| JP | 2009-189185 | 8/2009 |
| JP | 2009-235517 | 10/2009 |
| JP | 10-75562 | 3/2010 |
| JP | 2010-115076 | 5/2010 |
| JP | 2013-515900 | 5/2013 |
| WO | 2004/107367 | 12/2004 |
| WO | 2011/077119 | 6/2011 |
| WO | 2011077118 | 6/2011 |
| WO | 2011077162 | 6/2011 |

OTHER PUBLICATIONS

Somaloys Composite Material Resistivity 2010.*
International Search Report for PCT/GB2013/050106 dated Dec. 13, 2013.
Written Opinion for PCT/GB2013/050106 dated Dec. 13, 2013.
Japanese First Office Action, Japanese Patent Application No. 2014-552691, dated Aug. 9, 2016.

* cited by examiner

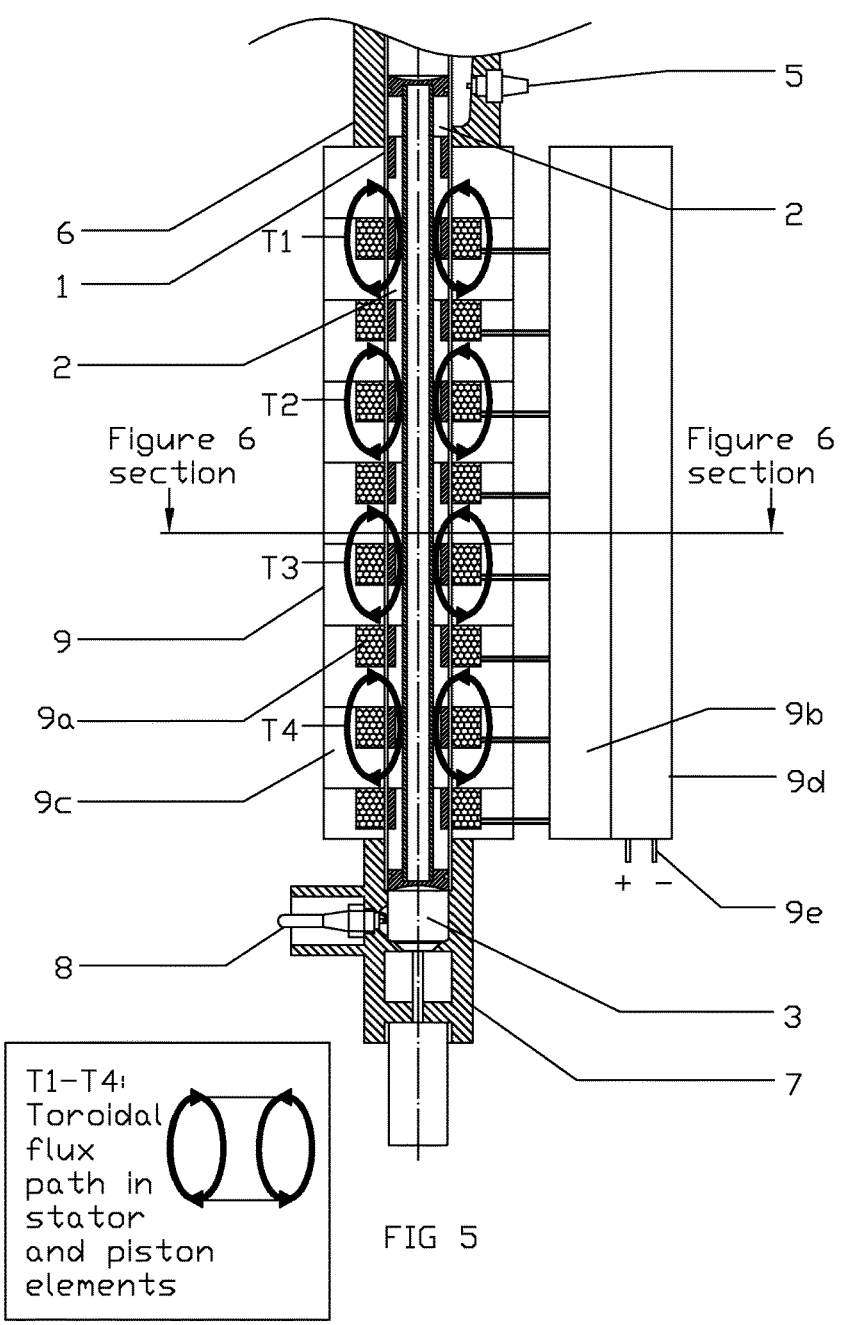
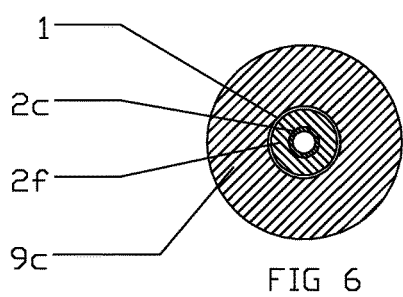

LINEAR ELECTRICAL MACHINE/GENERATOR WITH SEGMENTED STATOR FOR FREE PISTON ENGINE GENERATOR

CROSS REFERENCE TO RELATED APPLICATION

The present application is the U.S. national stage application of International Application PCT/GB2013/050106, filed Jan. 18, 2013, which international application was published on Jul. 25, 2013, as International Publication WO2013/108034. The international Application claims priority of British Patent Application 1200889.2, filed Jan. 19, 2012, the contents of which are incorporated herein by reference in their entireties.

BACKGROUND OF THE INVENTION

The present invention relates to a linear electrical machine and in particular linear electrical generator for a free piston engine generator.

In standard combustion engines, pistons are mechanically restrained within their cylinder as a result of being connected to a crankshaft, which is driven rotationally as a result of the reciprocating linear movement of the piston within the cylinder. In a free piston engine, however, the piston is not connected to a crankshaft, although pistons may be provided within an engine of this type that do have external mechanical linkages such as taught in U.S. Pat. No. 7,383,796.

Furthermore, it is known that electrical power can be generated by movement of a reciprocating piston in a free piston engine through one or more electrical coils to generate a magnetic flux change, for example U.S. Pat. No. 7,318,506. In this arrangement the piston carries a first coil and as it reciprocates within the cylinder it generates an electric current in a second coil that surrounds the cylinder. However, the piston is constructed from a solid piece of material that is permeable to magnetic flux and is necessarily very short relative to the length of the cylinder so that it may induce the flux changes as it passes through the second coil.

In existing free piston engines, the length of the piston is typically less than five times the diameter of the cylinder bore of the combustion chamber. The power output of the electrical machine in a free piston engine is determined by the area of the air gap, and to achieve an air gap area sufficient for a given combustion chamber geometry, which is determined by the diameter and swept volume, the diameter of the electrical machine is generally larger than the diameter of the combustion chamber. This change in diameter necessitates complex and expensive mechanical solutions to seal each combustion chamber, and to ensure that these are coaxially aligned with each other and with the axis of the intervening electrical machine.

Three fundamental design challenges for free piston engine generators are:
 firstly to achieve high electrical efficiency in an electrical machine, sized appropriately for the combustion power output of the engine
 secondly to achieve a good degree of piston motion control and combustion chamber design so that the combustion process efficiency and completeness can be assured
 Thirdly, to resolve the first two challenges at the lowest possible cost

SUMMARY OF THE INVENTION

The present invention provides an advantageous combination of features concerning the design of the linear electrical machine, piston, and combustion chamber which together provide a highly efficient combustion process, allow highly efficient electrical power conversion of the combustion power output, provide a high electrical machine control force acting on low piston mass for more consistent combustion process control, and avoids the use of costly rare earth magnetic materials in the piston and complex design interfaces between combustion and electrical power generation mechanisms in the engine. The present invention therefore addresses each of the identified design challenges.

According to the present invention there is provided a linear electrical machine comprising a movable piston translator, an axially segmented cylinder stator defining a bore therethough and comprising at least one magnetically permeable segment and configured to allow the piston to move within the bore, a cylinder housing having a bore for receiving the segmented cylinder, and means for securing the segmented cylinder in place.

Preferably one or more of the axial segments are formed from an isotropic magnetically permeable material such as soft magnetic composite (SMC) having an isotropic electrical resistivity of greater than $5.0 \times 10^{-6}$ $\Omega \cdot m$ in all directions.

Preferably the cylindrical stator is secured within a cylinder housing by clamping, adhesive bonding, interference fitting or other fixing means. The cylinder housing provides cooling means and structural support to the cylindrical stator, and has an internal bore of similar dimensions to the external diameter of the stator so that the cylinder housing also provides coaxial alignment of the segmented elements of the cylindrical stator.

Preferably at least one of the stator elements secured within the cylinder housing has a low Young's Modulus (Modulus of Elasticity) which is no greater than 10 GPa ($10 \times 10^9$ $N/m^2$) so that any clearance between the cylindrical stator element outer diameter and the cylinder housing bore is reduced by a radial expansion of the stator element under the action of an axial clamping load.

Preferably, the cylinder housing has a uniform cross section along at least a portion of its length and typically along at least a third of its length so that cooling channels and cooling fin features may be provided to increase the heat transfer from the cylindrical stator elements within the cylinder housing.

Preferably, the cylindrical internal bore of each segmented stator element is coated with a hard wearing material such as silicon nitride, silicon carbide or other ceramic or similarly hard material so that this may be honed or otherwise finished once the segmented stator elements are secured in place within the cylinder housing by clamping or other means.

The piston translator of the linear electrical machine preferably comprises one or more magnetically permeable elements, having isotropic magnetic permeability and electrical resistivity, arranged along a piston shaft and secured by clamping or other means such that contact is maintained between neighbouring elements, wherein the length of the piston is at least five times its maximum diameter.

This ratio of piston length to piston diameter provides a better match between the power output of the combustion chamber and the power capacity of the air gap having an area equal to the cylindrical surface of the elongated piston. As a result, the air gap and combustion chamber diameters can be equivalent and no change in diameter is required between the combustion chambers at opposite ends of the piston. As a result, this linear electrical machine enables a free piston engine to be constructed at lower cost than existing types of free piston engine.

Furthermore, the present invention provides a linear electrical machine that is particularly effective in an engine generator having a plurality of coils contained within or provided adjacent to a number of the cylindrical stator elements in which the piston reciprocates, and whose coils provide an axial flux electrical machine topology in which toroidal magnetic flux circuits are coaxial with the direction of travel of the piston. The isotropic magnetic permeability and electrical resistivity of the piston and stator elements permits this axial flux topology with minimal eddy current losses in the piston, offering higher efficiency and control force than other Free Piston Engine electrical machine concepts. Furthermore, the moving piston mass in this axial flux configuration is lower than is possible in equivalent transverse flux configurations, improving the control authority of the electromagnetic force exerted by the coils, and allowing improved piston motion control compared to transverse flux configurations.

Preferably, a piston crown is provided at each extremity of the piston to protect the core and spacer elements from the effects of combustion. Alternatively each piston may have a single piston crown facing the combustion chamber, the opposite end of the piston facing a bounce chamber that serves to reverse the direction of the piston at the end of each power stroke. Alternatively each piston may have a single piston crown facing a central combustion chamber between two opposed pistons moving in counter-phase with each other to achieve a fully balanced engine unit.

Preferably, the piston crown is constructed from a lightweight, temperature resistant and insulating material such as ceramic or titanium, and/or has a concave surface to reduce heat loss at top dead centre. Preferably the piston crown is coated with or constructed from a oxidation catalyst material that improves the consistency and completeness of combustion in the combustion chamber. Preferably the exposed surface area of the piston crown is at least twice the section area of the piston, increasing the efficacy of the combustion catalyst.

Preferably the piston shaft is hollow to reduce the piston mass, and the magnetically permeable element or elements coaxially arranged on the piston shaft are formed as annular rings having the same outer diameters. Preferably, part of the circumferential surface of the cylinder is coated in a friction reducing and wear-resistant material.

BRIEF DESCRIPTION OF THE DRAWINGS

An example of the present invention will now be described with reference to the following figures, in which:

FIG. 5 is a sectional view of one of the linear electrical machines of FIG. 1 illustrating the magnetic flux in switched stator elements caused by the coils and by movement of the piston according to the present invention;

FIG. 6 is a perpendicular section through a linear electrical machine showing the linear generator stator and magnetically permeable element in the piston arranged in close proximity;

DETAILED DESCRIPTION OF THE INVENTION

Figure 1:
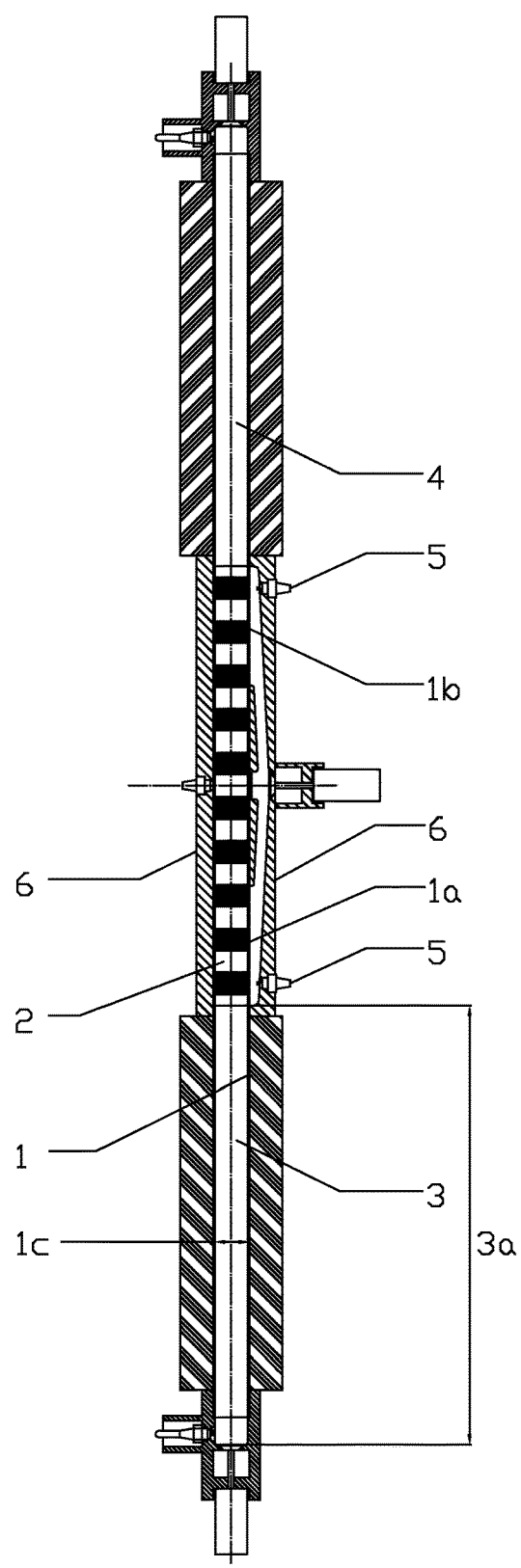
FIG. 1 shows a longitudinal section through a free piston engine generator having two linear electrical machines according to an example of the present invention, the piston having a piston crown at both ends.

In these figures and specification, the following labels are used:
1—Cylinder bore surface layer
1a—First intake port aperture
1b—Second intake port aperture
1c—Cylinder bore
2—Piston
2a—Piston outer surface
2b—Piston end surface
2c—Piston shaft
2d—Piston crown
2e—Lubrication control feature
2f—Magnetically permeable piston core element
2g—Non-permeable piston spacer element
2h—Piston shaft end
2i—Piston shaft cap
3—First combustion chamber
3a—First combustion chamber height
4—Second combustion chamber
5—Fuel injection means
5a—Fuel
6—Intake means
6a—Intake sliding port valve apertures
6b—Air intake
6c—Intake valve
6d—Intake valve actuator
6e—Intake charge compressor
6f—Intake manifold
6g—Intake valve recess
6h—Intake channel
7—Exhaust means
7a—Cylinder head
7b—Exhaust valve
7c—Exhaust valve actuator
7d—Exhaust manifold channel
8—Ignition means
9—Segmented cylindrical stator
9a—Coils
9b—Switching device
9c—Magnetically permeable stator elements
9d—Control module
9e—Electrical output means
10—Lubricant and coolant application means
11—Cylinder housing
11a—Cooling channel formed within cylinder housing
11b—Cooling fin formed within cylinder housing
12—Clamping plate
T1, T2, T3 & T4—Toroidal flux paths in the stator and piston elements FIG. 1 shows an example of the present invention provided within a single cylinder a free piston engine electrical power generation system. It can be seen that the piston 2 is free to move along the length of the cylinder, the piston being constrained in coaxial alignment with the cylinder bore 1c, thereby effectively partitioning the cylinder volume into a first combustion chamber 3 and a second combustion chamber 4, each chamber having a variable volume depending on the position of the piston 2 within the cylinder. No part of the piston 2 extends outside the cylinder bore 1c. Using the first chamber 3 as an example, each of the chambers 3, 4 has a variable height 3a and a fixed diameter according to the diameter of cylinder bore 1c. The internal bore surfaces of segmented cylindrical stators 9 and the intake means 6 are each, in the embodiment, coated with a hard wearing layer. Together the internal bore coatings on these elements form a contiguous cylinder bore surface layer 1. Although shown in the figures with a thin surface layer 1 on the inner surface of the cylinder, the invention also covers an embodiment in which the inner surface layer 1 of the cylinder is provided not by a separate hard wearing layer, but by the axial segments of magnetisable and non magnetisable material themselves.

The cylinder bore 1c is, preferably, rotationally symmetric about its axis and is symmetrical about a central plane perpendicular to its axis. Although other geometric shapes could potentially be used to perform the invention, for example having square or rectangular section pistons, the arrangement having circular section pistons is preferred. The cylinder bore 1c has a series of apertures 1a, 1b provided along its length and distal from the ends, preferably in a central location. Through motion of the piston 2, the apertures 1a, 1b form sliding port intake valve aperture 6a, which is arranged to operate in conjunction with an air intake 6b provided around at least a portion of the cylinder bore 1c, as is described in detail below.

Figure 2:
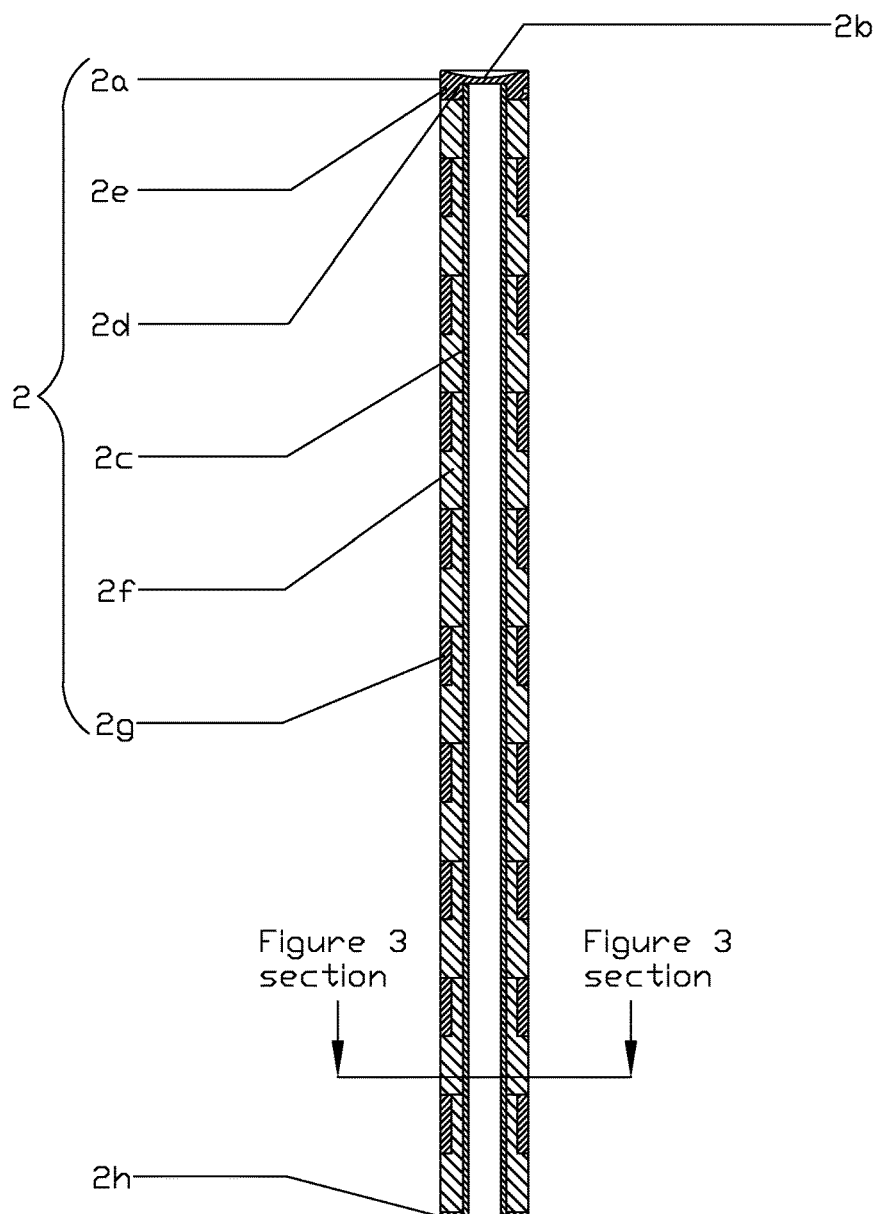
FIG. 2 is a longitudinal section through the piston of FIG. 1, showing the construction from elements coaxially arranged on a hollow piston shaft.

FIG. 2 shows a piston 2 having an outer surface 2a and comprising a central shaft 2c onto which are mounted a series of cylindrical elements. These cylindrical elements may include a piston crown 2d at each end of the central shaft 2c, each piston crown 2d preferably constructed from a temperature resistant and insulating material such as ceramic, titanium or titanium composite. The piston crown end surface 2b is, preferably, slightly concave, reducing the surface area-to-volume ratios of the first and second chambers 3, 4 at top dead centre and thereby reducing heat losses. Alternatively, the piston crown 2d may be formed from or coated with a material that acts as an oxidation catalyst to ensure the completeness of combustion in which case it is preferable that the exposed end surface of the piston crown 2b has an area that is substantially larger than the section area of the piston, so that the catalyst surface action on the combustion chamber volume contents is enhanced. Of course, if the cylinder was of a different geometry then the configuration of these elements would be adapted accordingly.

Part of the piston outer surface 2a may be coated in a friction reducing and wear-resistant material. The piston crown 2d may include lubrication control features 2e to control the degree of lubrication wetting of the cylinder bore 1c during operation of the engine. These lubrication control features may comprise a groove and an oil control ring as are commonly employed in conventional internal combustion engines.

One or more magnetically permeable core elements 2f are mounted on the piston shaft 2c. Each core element 2f is constructed from a magnetically permeable material having isotropic magnetic permeability and isotropic electrical resistivity to reduce eddy current losses during operation of the engine.

Spacer elements 2g are also mounted on the piston shaft 2c. Each spacer element 2g ideally has low magnetic permeability and is preferably constructed from a lightweight material such as aluminium alloy or ceramic.

Preferably the magnetically permeable core elements are formed from an electrically permeable composite material such as Soft Magnetic Composite (SMC) having an isotropic electrical resistivity of greater than twice than of electrical steel and greater than $5.0 \times 10^{-6}$ Ω·m in all directions. This isotropic characteristic permits the use of non-planar magnetic flux circuits such as those shown in FIG. 5 and described below, without these flux circuits causing high iron losses as a result of induced eddy currents. Such eddy currents would cause significant electrical losses if this non-planar magnetic circuit topology was applied using conventional steel laminations since the electrical resistivity in the plane of the laminations is typically very low.

The design of the magnetically permeable core elements 2f and non-permeable spacer elements 2g positions the core elements 2f at the correct pitch for efficient operation as, for example, part of a linear switched reluctance or switched flux electrical generator machine comprising the moving piston 2 and a segmented cylindrical stator 9. Such a machine may include a plurality of coils spaced along the length of the cylinder within which the piston reciprocates.

The total length of the piston is, preferably, at least five times its diameter and in any case it is at least sufficiently long to completely and simultaneously cover both intake port apertures 1a and 1b so that at no time during a complete cycle does the intake channel 6h allow combustion chambers 3 and 4 to communicate.

The piston shaft ends 2h are mechanically deformed or otherwise fixed to the piston crowns 2d such that the elements 2f and 2g that are mounted to the piston shaft 2c are securely retained under the action of tension maintained in the piston shaft 2c.

Figure 3:
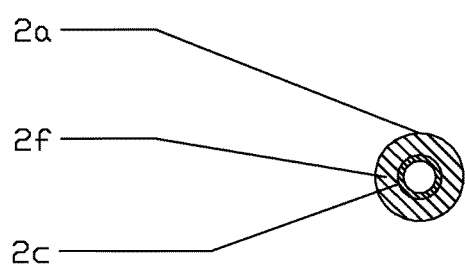
FIG. 3 is a perpendicular section through the piston, showing the concentric arrangement of the shaft and circular elements.

FIG. 3 is a sectional view of the piston 2, showing the piston shaft 2c passing through a core element 2f.

Figure 4:
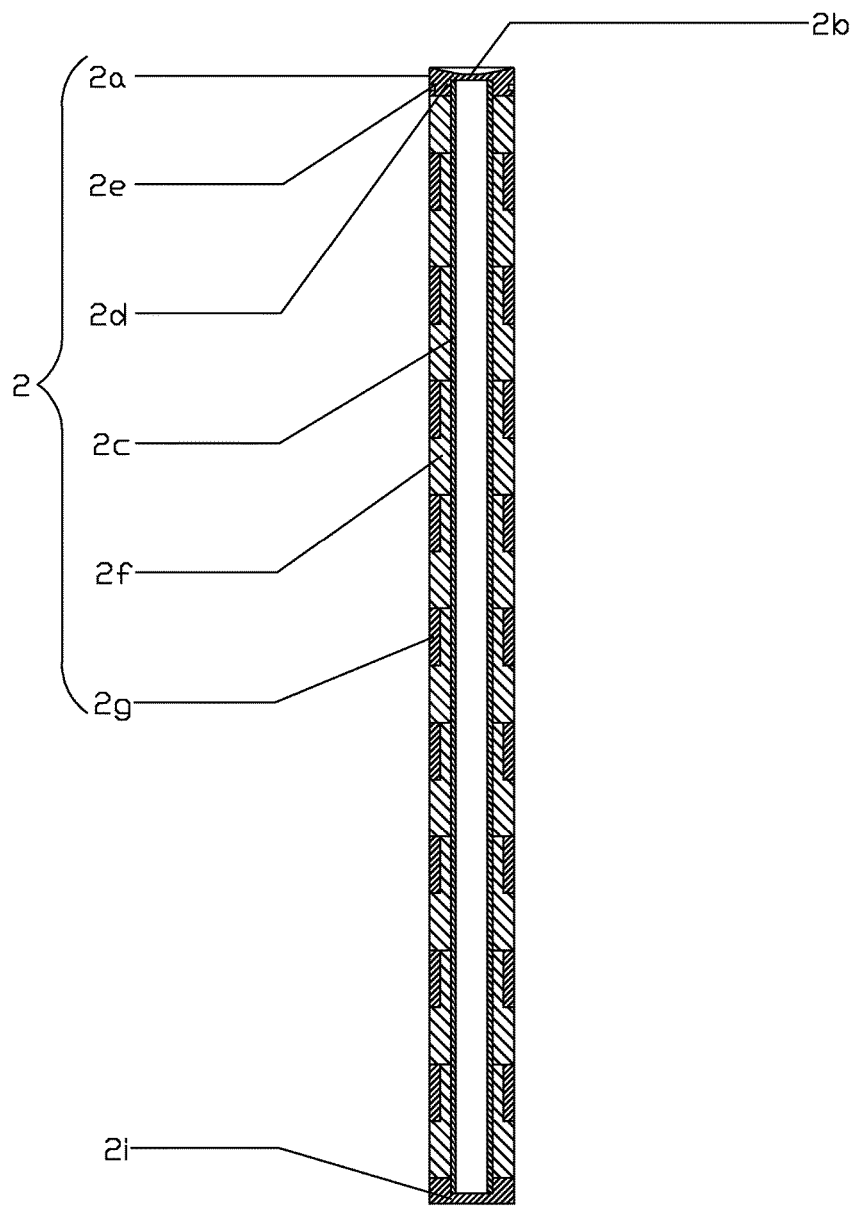
FIG. 4 is a longitudinal section through an alternative embodiment of the piston, having a piston crown at one end only.

FIG. 4 shows an alternative embodiment of the present invention in which the piston 2 has a piston crown 2d at one end only, the other end being sealed with a lightweight piston shaft cap element 2i. This embodiment is suitable for use in an opposed piston free piston engine, or a free piston engine in which each cylinder has a single combustion chamber at one end, the other end having a bounce chamber that serves to reverse the direction of the piston at the end of each power stroke.

FIG. 5 shows an example of a linear electrical machine comprising an axially segmented cylindrical stator 9 having magnetically permeable stator elements 9c and coils 9a. The segmented cylindrical stator 9 is configured to provide a common cylinder bore 1c within which the piston 2 is free to move. This arrangement facilitates the transfer of energy between piston 2 and electrical output means 9e and provides a force to control the position and movement of the piston. The segmented cylindrical stator 9 includes a number of coils 9a and a number of stator elements 9c distributed along its length.

The segmented cylindrical stator 9 may be configured to act in conjunction with piston 2 as of a number of different electrical machine types, for example a linear switched reluctance generator or a linear switched flux generator machine. In the arrangement shown, coils 9a are switched by switching device 9b so as to induce magnetic fields within stators 9c and the piston core elements 2f. In this embodiment, switching device 9b varies the current in coils 9a with a frequency of at least 100 Hz. This switching is precisely timed in relation to the movement of the piston so that the piston's movement cuts the flux generated by the current in the coils, applying a force on the piston and transferring kinetic energy from the piston into electrical power in the coils.

In the arrangement shown in FIG. 5, toroidal magnetic flux circuits T1-T4 are created in the stators 9c and piston core elements 2f under the action of the switched current in coils 9a. The segmented cylindrical stator 9 and piston 2 together function as a linear switched reluctance device, or as a linear switched flux device. Power is generated at the electrical output means 9e as a consequence of the magnetic flux circuits T1-T4 being cut by the motion of the piston 2 and thereby inducing current in coils 9a. The toroidal topology of the magnetic flux circuits provides an exceptionally high flux density and rate of flux cutting per unit mass of magnetically permeable translator elements 2f, thereby increasing the control force acting on each unit of mass of the piston translator and so improving the control authority of the electrical machine over the position and movement of the piston 2. In addition, this arrangement permits a highly efficient electrical generation means without the use of permanent magnets in the piston, which may demagnetise under the high temperature conditions within an internal combustion engine, and which might otherwise add significant cost to the engine due the use of costly rare earth metals.

Additionally, a control module 9d may be employed, comprising several different control means, as described below. The different control means are provided to achieve the desired rate of transfer of energy between the piston 2 and electrical output means 9e in order to deliver a maximum electrical output whilst satisfying the desired motion characteristics of the piston 2, including compression rate and ratio, expansion rate and ratio, and piston dwell time at top dead centre of each chamber 3, 4.

A valve control means may be used to control the intake valve 6c and the exhaust valve 7b. By controlling the closure of the exhaust valve 7b, the valve control means is able to control the start of the compression phase. In a similar way, the valve control means can also be used to control exhaust gas recirculation (EGR), intake charge and compression ratio.

A compression ratio control means that is appropriate to the type of electrical machine may also be employed. For example, in the case of a switched reluctance machine, compression ratio control is partially achieved by varying the phase, frequency and current applied to the switched coils 9a. This changes the rate at which induced transverse flux is cut by the motion of the piston 2, and therefore changes the force that is applied to the piston 2. Accordingly, the coils 9a may be used to control the kinetic energy of the piston 2, both at the point of exhaust valve 7b closure and during the subsequent deceleration of the piston 2.

A spark ignition timing control means may then be employed to respond to any residual cycle-to-cycle variability in the compression ratio to ensure that the adverse impact of this residual variability on engine emissions and efficiency are minimised, as follows. Generally, the expected compression ratio at the end of each compression phase is the target compression ratio plus an error that is related to system variability, such as the combustion event that occurred in the opposite combustion chamber 3, 4, and the control system characteristics. The spark ignition timing control means may adjust the timing of the spark ignition event in response to the measured speed and acceleration of the approaching piston 2 to optimize the combustion event for the expected compression ratio at the end of each compression phase.

The target compression ratio will normally be a constant depending on the fuel 5a that is used. However, a compression ratio error may be derived from any variation of the final combustion chamber height 3a at top dead centre. Hence if a chamber height variation of +1-20% arises, and the target compression ratio is 12:1, the actual compression ratio may be in the range 10:1 to 15:1. Advancement or retardation of the spark ignition event by the spark ignition timing control means will therefore reduce the adverse emissions and efficiency impact of this error.

Additionally, a fuel injection control means may be employed to control the timing of the injection of fuel 5a so that it is injected into a combustion chamber 3, 4 immediately prior to the sliding port valve aperture 6a closing to reduce hydrocarbon (HC) emissions during scavenging.

Furthermore, a temperature control means may be provided, including one or more temperature sensors positioned in proximity to the coils 9a, electronic devices and other elements sensitive to high temperatures, to control the flow of cooling fluid applied by coolant application means 10, and the flow of cooling air provided by the compressor 6e into cooling channels 11a in response to detected temperature changes. The temperature control means may be in communication with the valve control means to limit engine power output when sustained elevated temperature readings are detected to avoid engine damage.

Further sensors that may be employed by the control module 9d preferably include an exhaust gas (Lambda) sensor and an air flow sensor to determine the amount of fuel 5a to be injected into a chamber according to the quantity of air added, for a given fuel type. Accordingly, a fuel sensor may also be employed to determine the type of fuel being used.

FIG. 6 shows a perpendicular section through one of the stator elements 9c, showing the close proximity of the stator elements 9c and the magnetically permeable piston elements 2f, separated by the thickness of the cylinder bore surface layer 1. In addition, FIG. 6 shows the coaxial arrangement of magnetically permeable elements 2f with the hollow piston shaft 2c.

Figure 7:
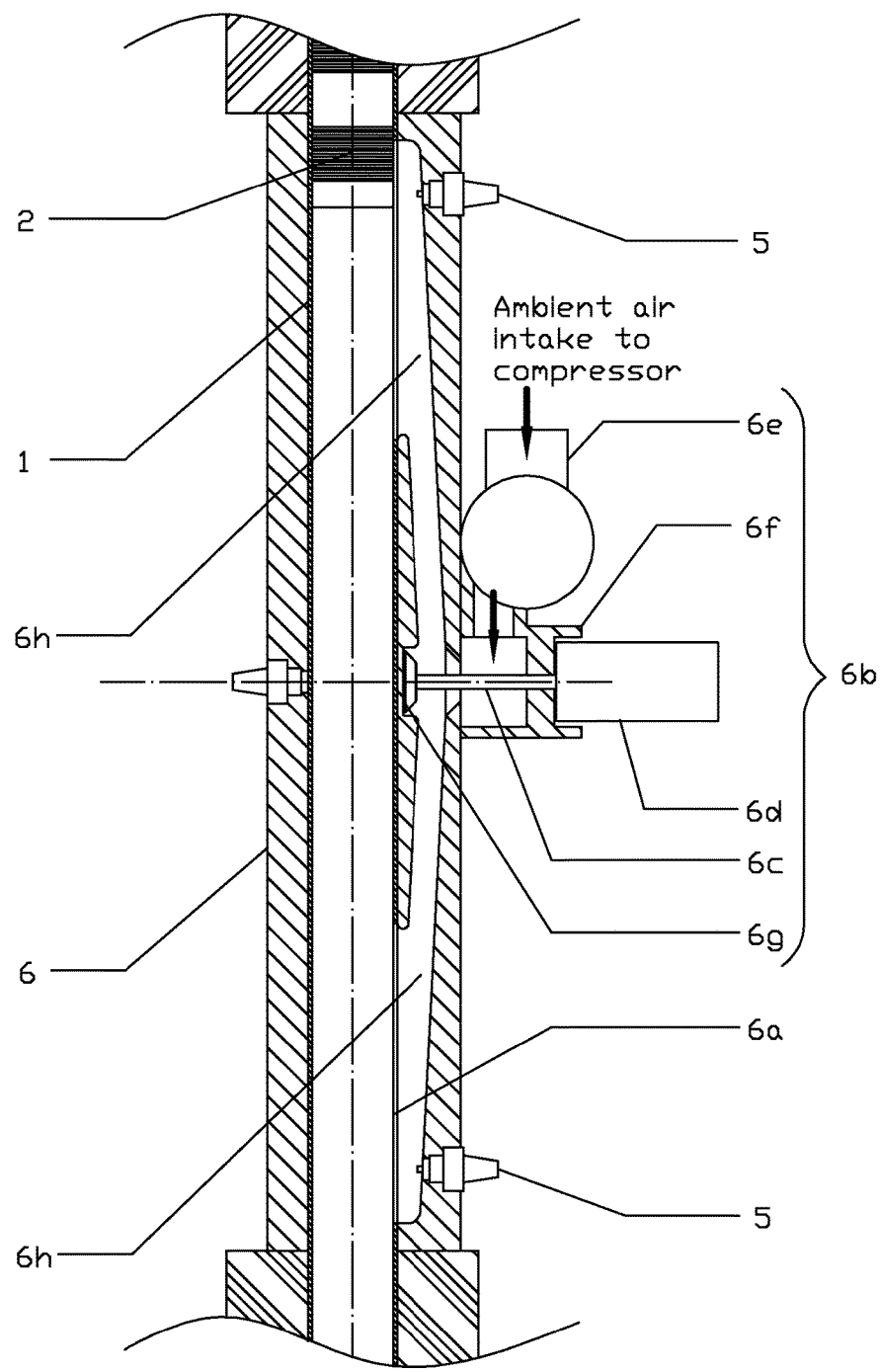
FIG. 7 is a more detailed longitudinal section of the intake valve, intake sliding port valve apertures and fuel injector arrangement during the intake charge displacement scavenging phase.

FIG. 7 shows the intake means 6 comprising sliding port valve apertures 6a and an air intake 6b. The sliding port valve apertures 6a in the intake means 6 are connected by a channel 6h in which an intake valve 6c is seated. The channel 6h is of minimal volume, either having a short length, small cross sectional area or a combination of both, to minimise uncontrolled expansion losses within the channel 6h during the expansion phase. Alternatively a separate intake valve 6c may be provided in close proximity to each sliding port valve aperture 6a, this alternative arrangement also preventing uncontrolled expansion losses into channel 6h.

The intake valve 6c seals the channel 6h from an intake manifold 6f as part of the air intake 6b. The intake valve 6c is operated by an intake valve actuator 6d, which may be an electrically operated solenoid means or other suitable electrical or mechanical means.

When the sliding port intake valve aperture 6a and the intake valve 6c are both open with respect to one of the first or second chambers 3, 4, the intake manifold 6f is in fluid communication with that chamber via the channel 6h. The intake means 6 is preferably provided with a recess 6g arranged to receive the intake valve 6c when fully open to ensure that fluid can flow freely through the channel 6h.

The air intake 6b also includes an intake charge compressor 6e which may be operated electrically, mechanically, or under the action of pressure waves originating from the air intake 6b. The intake charge compressor 6e can also be operated under the action of pressure or pressure waves originating from an exhaust means 7 provided at each end of the cylinder bore 1c, as described below. The intake charge compressor 6e may be a positive displacement device, centrifugal device, axial flow device, pressure wave device, or any suitable compression device. The intake charge compressor 6e elevates pressure in the intake manifold 6f such that when the air intake 6b is opened, the pressure in the intake manifold 6f is greater than the pressure in the chamber 3 or 4 connected to the intake manifold 6f, thereby permitting a flow of intake charge fluid.

Fuel injection means 5 are also provided within the intake means 6, such as a solenoid injector or piezo-injector. Although a centrally positioned single fuel injector 5 may be adequate, there is preferably a fuel injector 5 provided adjacent to each sliding port valve apertures 6a. The fuel injectors 5 are preferably recessed in the intake means 6 such that the piston 2 may pass over and past the sliding port intake valve apertures 6a and air intake 6b without obstruction. The fuel injectors 5 are configured to inject fuel into the respective chambers 3, 4 through each of the sliding port intake valve apertures 6a Lubricant and coolant application means 10 are provided, preferably recessed within the intake means 6 and arranged such that the piston 2 may pass over and past the intake means 6 without obstruction, whereby the piston may be lubricated and cooled by the application of one or more fluids. The fluids applied may include conventional lubrication oil. In addition, the fluids may include water or another volatile liquid having a high heat of vaporisation. As this coolant fluid evaporates, heat in the piston is transferred into the fluid and resulting gas either vents in the combustion chamber as the piston travels, or resists the leakage of combustion blowby gases as the combustion chamber expands. The venting coolant gas increases the quantity of gas in the expanding combustion chamber and thereby incrementally increases the combustion chamber pressure. In this way, heat build up in the piston due to eddy currents caused by changing magnetic flux and by heat conduction from the combustion chambers may be recuperated as useful work applied to the piston by the expanding combustion chamber volume. In addition the venting gas may act as a gas bearing, reducing the friction and wear on the outer surface of the piston 2a.

Figure 8:
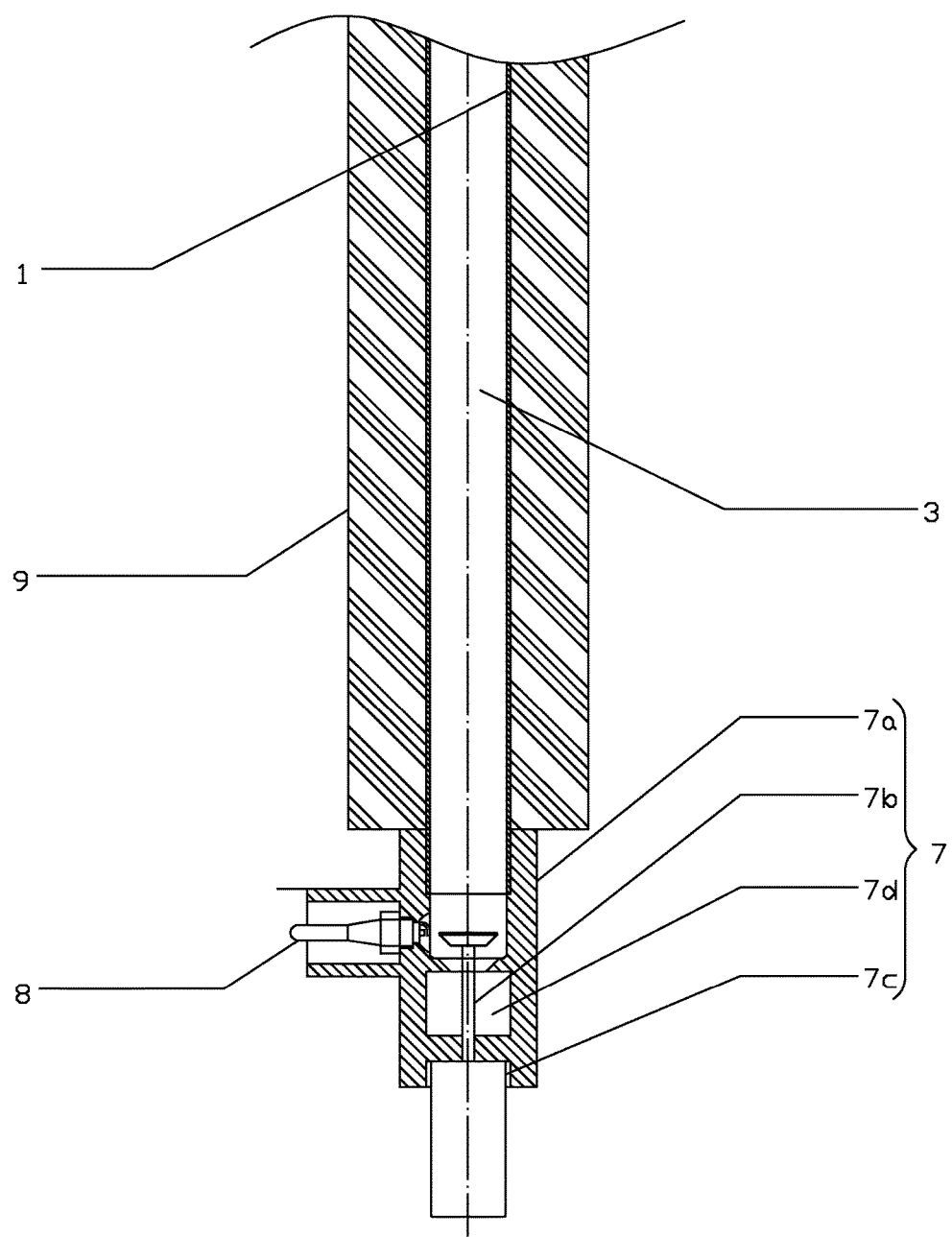
FIG. 8 is a more detailed longitudinal section of the exhaust means including the exhaust valve and actuator during the exhaust phase.

FIG. 8 shows the exhaust means 7 provided at each end of the cylinder bore 1c. The exhaust means 7 comprises a cylinder head 7a removably attached, by screw means or similar, to the end of the cylinder housing 11. Within each cylinder head 7a is located an exhaust valve 7b, coaxially aligned with the axis of the cylinder bore 1c. The exhaust valve 7b is operated by an exhaust valve actuator 7c, which may be an electrically operated solenoid means or other electrical or mechanical means. Accordingly, when the intake valve 6c or intake sliding port valve aperture 6a and the exhaust valve 7b within the first or second combustion chambers 3, 4, are both closed, that chamber is effectively sealed and a working fluid contained therein may be compressed or allowed to expand.

The exhaust means 7 also includes an exhaust manifold channel 7d provided within the cylinder head, into which exhaust gases may flow, under the action of a pressure differential between the adjacent first or second chamber 3, 4 and the fluid within the exhaust manifold channel 7d when the exhaust valve 7b is open.

Ignition means 8, such as a spark plug, are also provided at each end of the cylinder bore 1c, the ignition means 8 being located within the cylinder head 7a and, preferably, recessed such that there is no obstruction of the piston 2 during the normal operating cycle of the engine.

The, preferably, coaxial arrangement of the exhaust valve 7b with the axis of the cylinder bore 1c allows the exhaust valve 7b diameter to be much larger relative to the diameter of the chambers 3, 4 than in a conventional internal combustion engine.

Each cylinder head 7a is constructed from a hard-wearing and highly insulating material, such as ceramic to minimise heat rejection and avoid the need for separate valve seat components.

Figure 9:
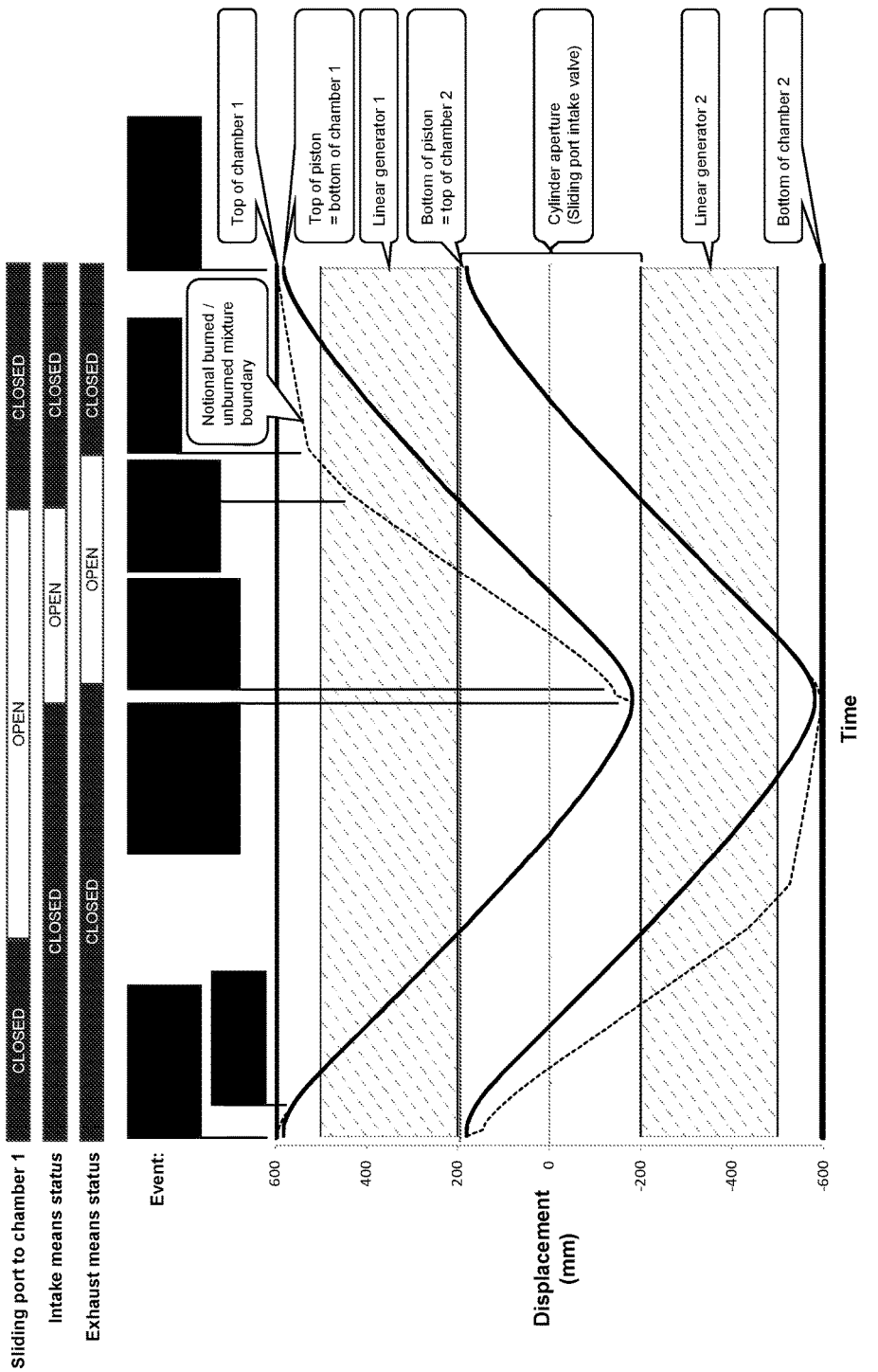
FIG. 9 is a time-displacement plot showing the changing piston position within a free piston engine cylinder during a complete engine cycle, and the timing of engine cycle events during this period.

FIG. 9 shows a time-displacement plot of an engine according to the present invention, illustrating the movement of the piston 2 over the course of a complete engine cycle. Although the operation of the engine is described here with reference to the first chamber 3, a skilled person will recognise that the operation and sequence of events of the second chamber 4 is exactly the same as the first chamber 3, but 180 degrees out of phase. In other words, the piston 2 reaches top dead centre in the first chamber 3 at the same time as it reaches bottom dead centre in the second chamber 4.

Figure 10:
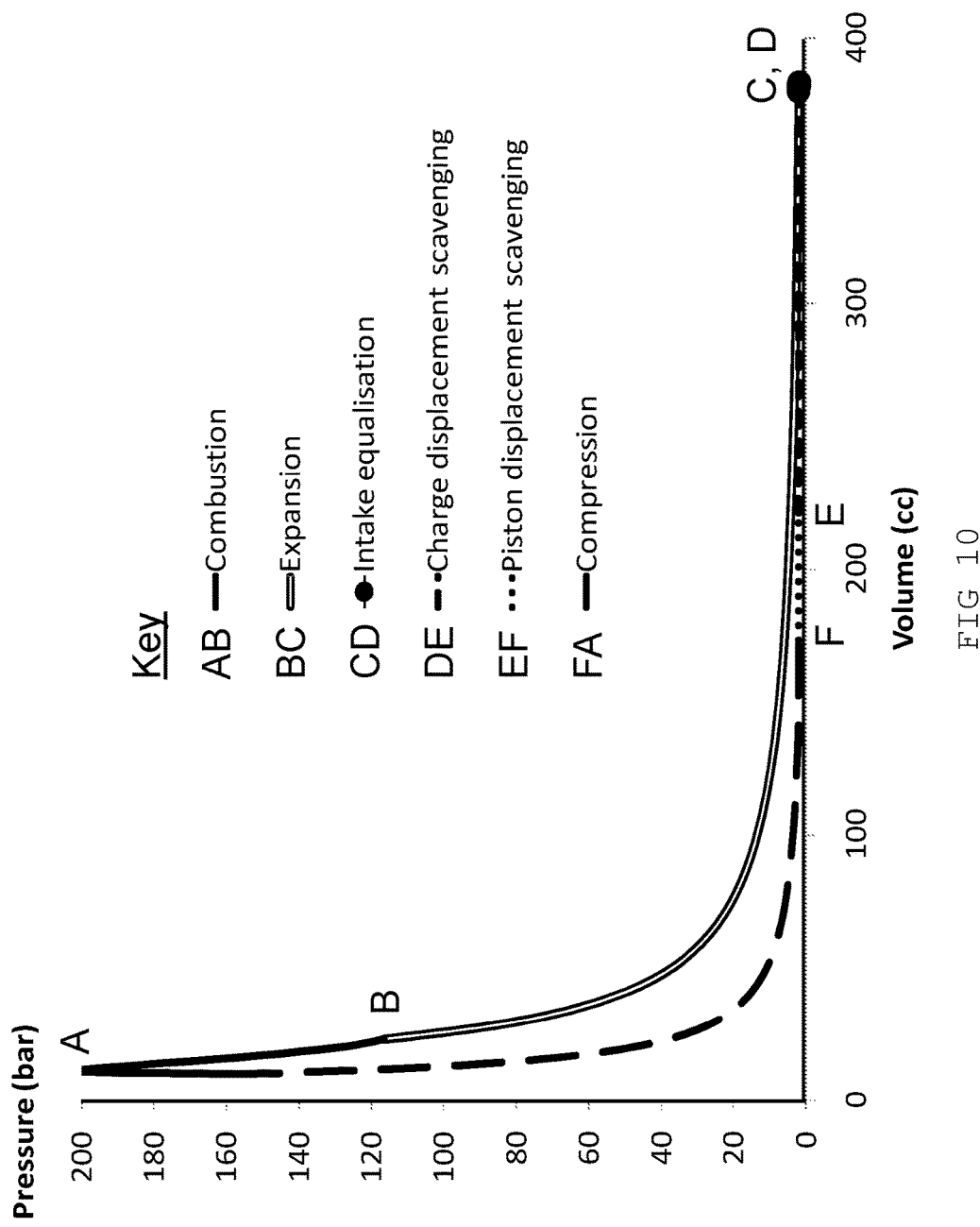
FIG. 10 is a pressure-volume plot showing a typical free piston engine cylinder pressure plot during a complete engine cycle.

The events A to F, highlighted throughout the engine cycle, correspond to the events A to F illustrated in FIG. 10, which shows a typical pressure-volume plot for a combustion chamber 3, 4 over the course of the same engine cycle. The events featured in FIGS. 9 to 10 are referred to in the following discussion of FIGS. 11 to 19.

Considering now a complete engine cycle, at the start of the engine cycle, the first chamber 3 contains a compressed mixture composed primarily of pre-mixed fuel and air, with a minority proportion of residual exhaust gases retained from the previous cycle. It is well known that the presence of a controlled quantity of exhaust gases is advantageous for the efficient operation of the engine, since this can reduce or eliminate the need for intake charge throttling as a means of engine power modulation, which is a significant source of losses in conventional spark ignition engines. In addition, formation of nitrous oxide pollutant gases are reduced since peak combustion temperatures and pressures are lower than in an engine without exhaust gas retention. This is a consequence of the exhaust gas fraction not contributing to the combustion reaction, and due to the high heat capacity of carbon dioxide and water in the retained gases.

Figure 11:
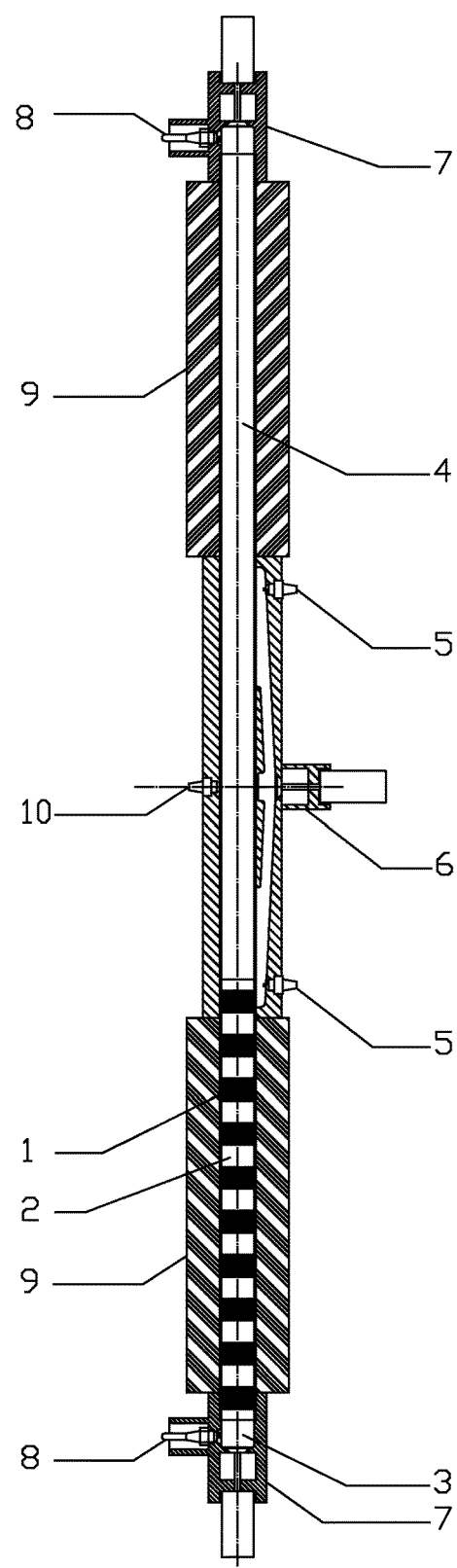
FIG. 11 is a schematic longitudinal section through a free piston engine cylinder at top dead centre, at the end of the compression phase and around the time of spark ignition and initiation of the combustion event in the first chamber.

FIG. 11 shows the position of the piston relative to the cylinder bore 1c, defining the geometry of the first chamber 3 at top dead centre (A). This is also around the point of initiation of the combustion phase AB. The distance between the top of the piston 2b and the end of the first chamber 3 is at least half the diameter of the first chamber 3, giving a lower surface area to volume ratio compared to combustion chambers in conventional internal combustion engines, and reducing the heat losses from the first chamber 3 during combustion. The ignition means 8 are recessed within the cylinder head 7a so that in the event that the piston 2 approaches top dead centre in an uncontrolled manner there is no possibility of contact between the ignition means 8 and the piston crown 2d. Instead, compression will continue until the motion of the piston 2 is arrested by the continuing build up of pressure due to approximately adiabatic compression in the first chamber 3. With reference to FIG. 10, the combustion expansion phase AB is initiated by an ignition event (A).

Figure 12:
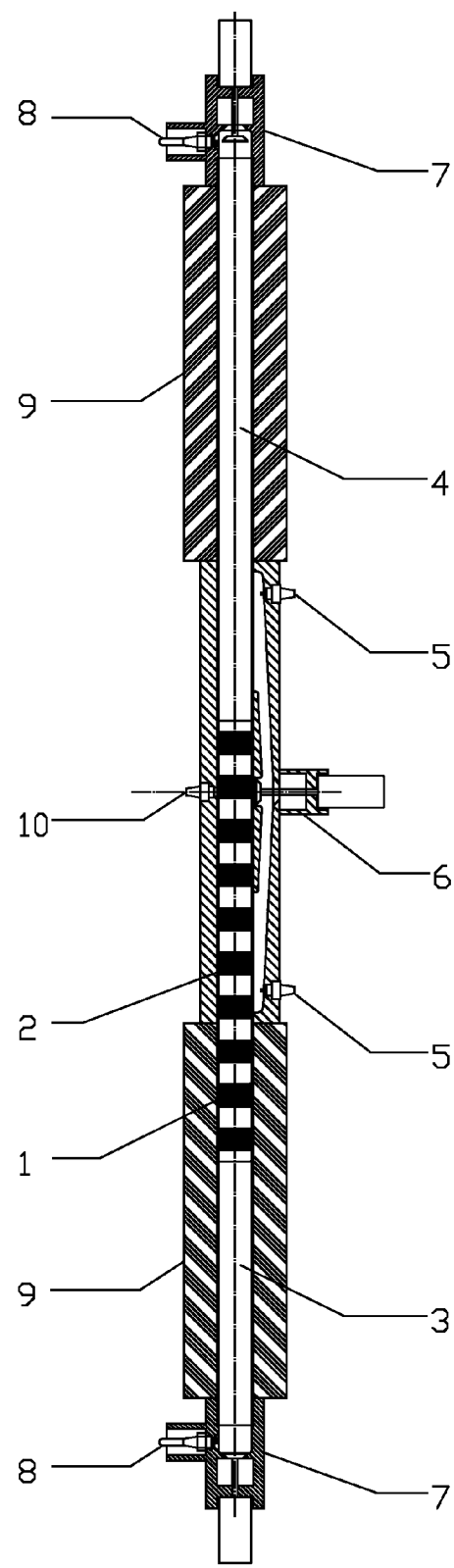
FIG. 12 is a schematic longitudinal section through a free piston engine cylinder mid way through the expansion phase of the first chamber.

FIG. 12 shows the position of the piston 2 mid-way through the expansion phase (AB and BC). The first chamber 3 expands as the piston 2 moves under the action of the pressure differential between the first chamber 3 and the second chamber 4. The pressure in the second chamber 4 at this point is approximately equivalent to the pressure in the intake manifold 6f. The expansion of the first chamber 3 is opposed by the action of the electromagnetic force applied by segmented cylindrical stator 9, which may be modulated in order to achieve a desired expansion rate, to meet the engine performance, efficiency and emissions objectives.

Figure 13:
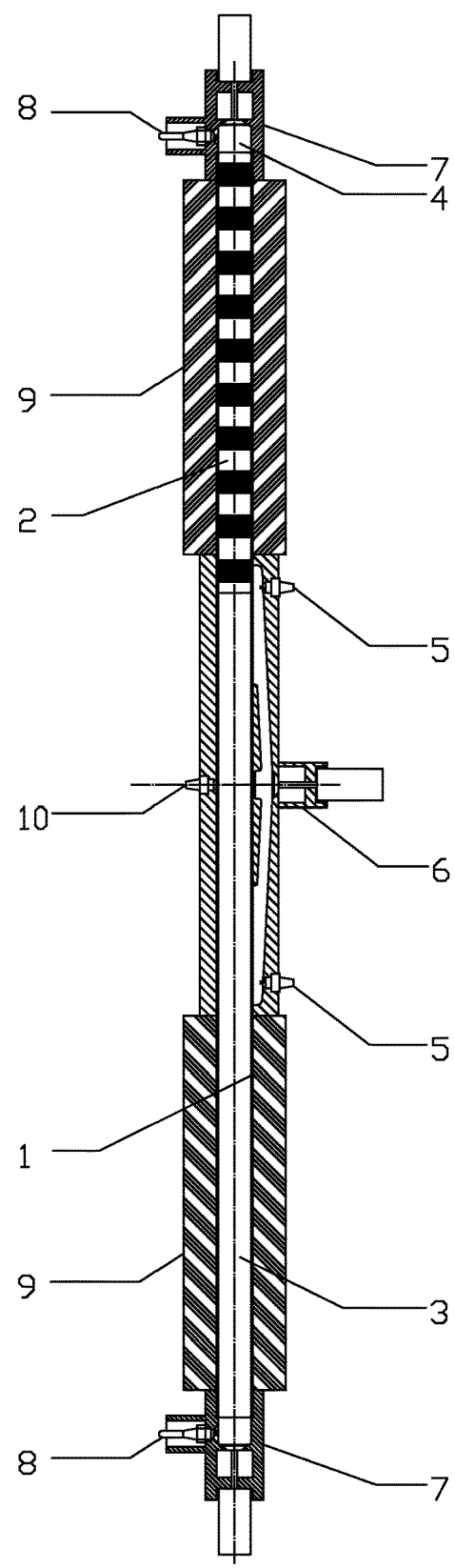
FIG. 13 is a schematic longitudinal section through a free piston engine cylinder at the end of the expansion phase, but before the intake and exhaust valves have opened.

FIG. 13 shows the position of the piston 2 at bottom dead centre relative to the first chamber 3. At the end of the expansion phase (C), the motion of the piston 2 is arrested under the action of the electromagnetic force applied by segmented cylindrical stator 9 and the pressure differential between the first chamber 3 and the second chamber 4. The pressure in the second chamber 4 at this point is approximately equal to the high pressure in the first chamber 3 at its top dead centre position (A). Preferably, the expansion ratio is at least two times the compression ratio, wherein the compression ratio is in the range of 10:1 to 16:1. This gives an improved thermal efficiency compared to conventional internal combustion engines wherein the expansion ratio is similar to the compression ratio.

Figure 14:
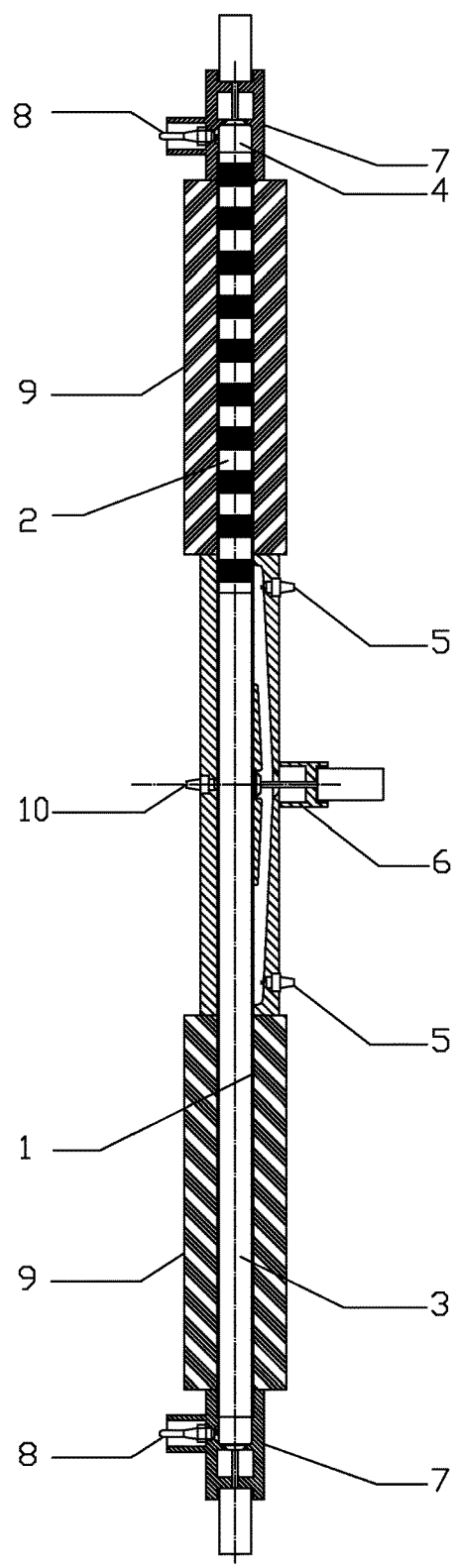
FIG. 14 is a schematic longitudinal section through a free piston engine cylinder following the opening of the intake valve to charge chamber 1, allowing intake charge fluid pressure to equalise the lower cylinder pressure in the first chamber.

FIG. 14 shows the arrangement of the piston 2 and intake means 6 and the initial flow of intake gas at the time of bottom dead centre during the intake equalisation phase (CD). This arrangement can also be seen in FIG. 7. At this point, the sliding port intake valve aperture 6a is open due to the piston 2 sliding through and past the apertures 1a, 1b provided along cylinder bore 1c. The pressure in the first chamber 3 is lower than the pressure in the intake manifold 6f due to the over-expansion reducing fluid pressure in the first chamber 3 and due to the intake compressor 6e elevating the pressure in the intake manifold 6h. Around this time, the intake valve 6c is opened by intake valve actuator 6d allowing intake charge to enter the first chamber 3 within cylinder bore 1c whose pressure approaches equalisation with the pressure at the intake manifold 6f. A short time after the intake valve 6c opens, the exhaust valve 7b is also opened allowing exhaust gases to exit the first chamber 3 under the action of the pressure differential between the first chamber 3 and the exhaust manifold channel 7d, which remains close to ambient atmospheric pressure.

Figure 15:
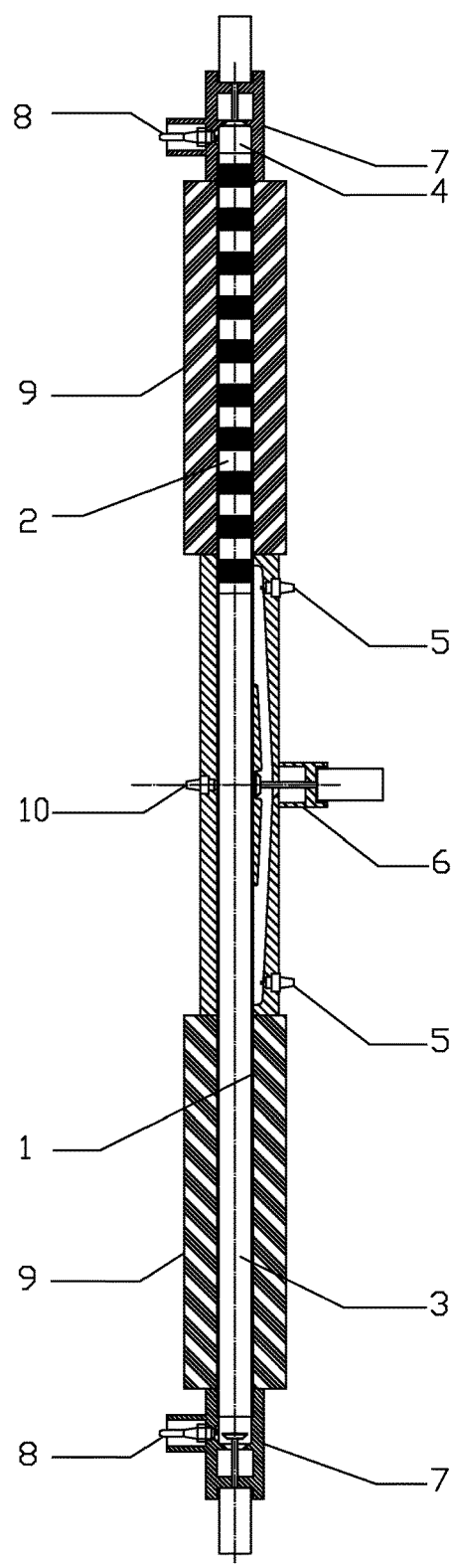
FIG. 15 is a schematic longitudinal section through a free piston engine cylinder following the opening of the exhaust valve, and whilst the intake valve remains open, scavenging the first chamber.

FIG. 15 shows the position of the piston 2 during the intake charge displacement scavenging phase (DE). Exhaust gas scavenging is achieved by the continuing displacement of exhaust gas in the first chamber 3 into the exhaust manifold channel 7d with fresh intake charge introduced at the piston end of the first chamber 3. Once the intended quantity of intake charge has been admitted to the first chamber 3, the intake valve 6c is closed and the expulsion of exhaust gas continues by the movement of the piston 2, as shown in FIG. 17, explained below.

Figure 16:
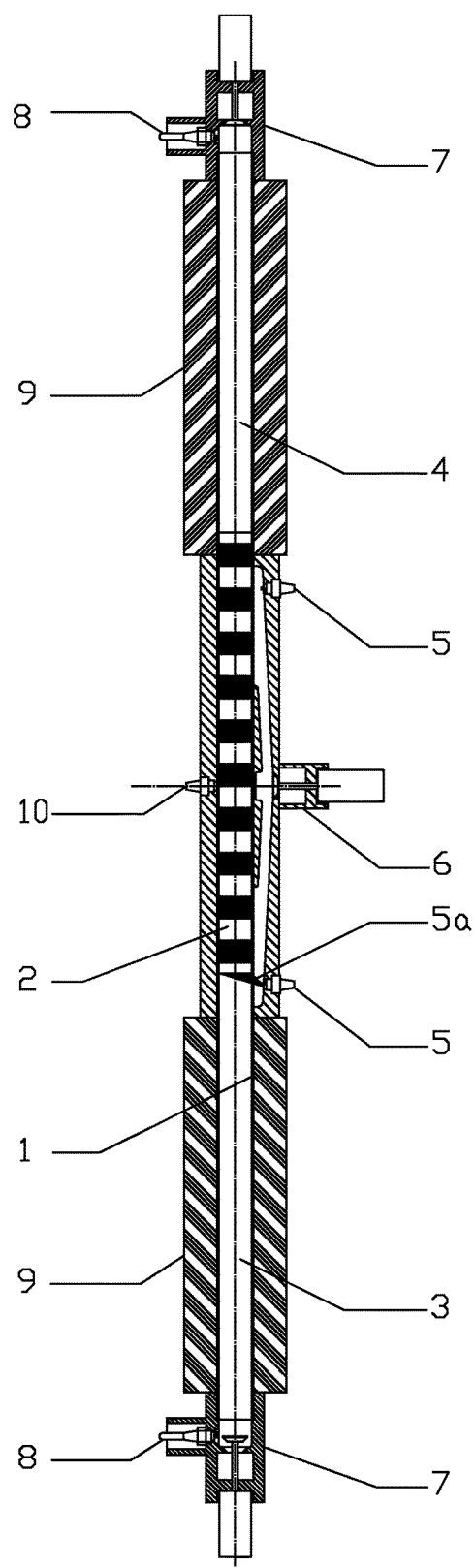
FIG. 16 is a schematic longitudinal section through a free piston engine cylinder during fuel injection into the first chamber after the intake valve has closed.

FIG. 16 shows the arrangement of the piston 2 and intake means 6 at the point of fuel injection (E). If a liquid fuel is used, this fuel 5a may be introduced directly onto the approaching piston crown 2d which has the effects of rapidly vaporising fuel, cooling the piston crown 2d and minimising the losses and emissions of unburned fuel as a wet film on cylinder bore 1c, which might otherwise vaporise in the second chamber 4 during the expansion phase.

Figure 17:
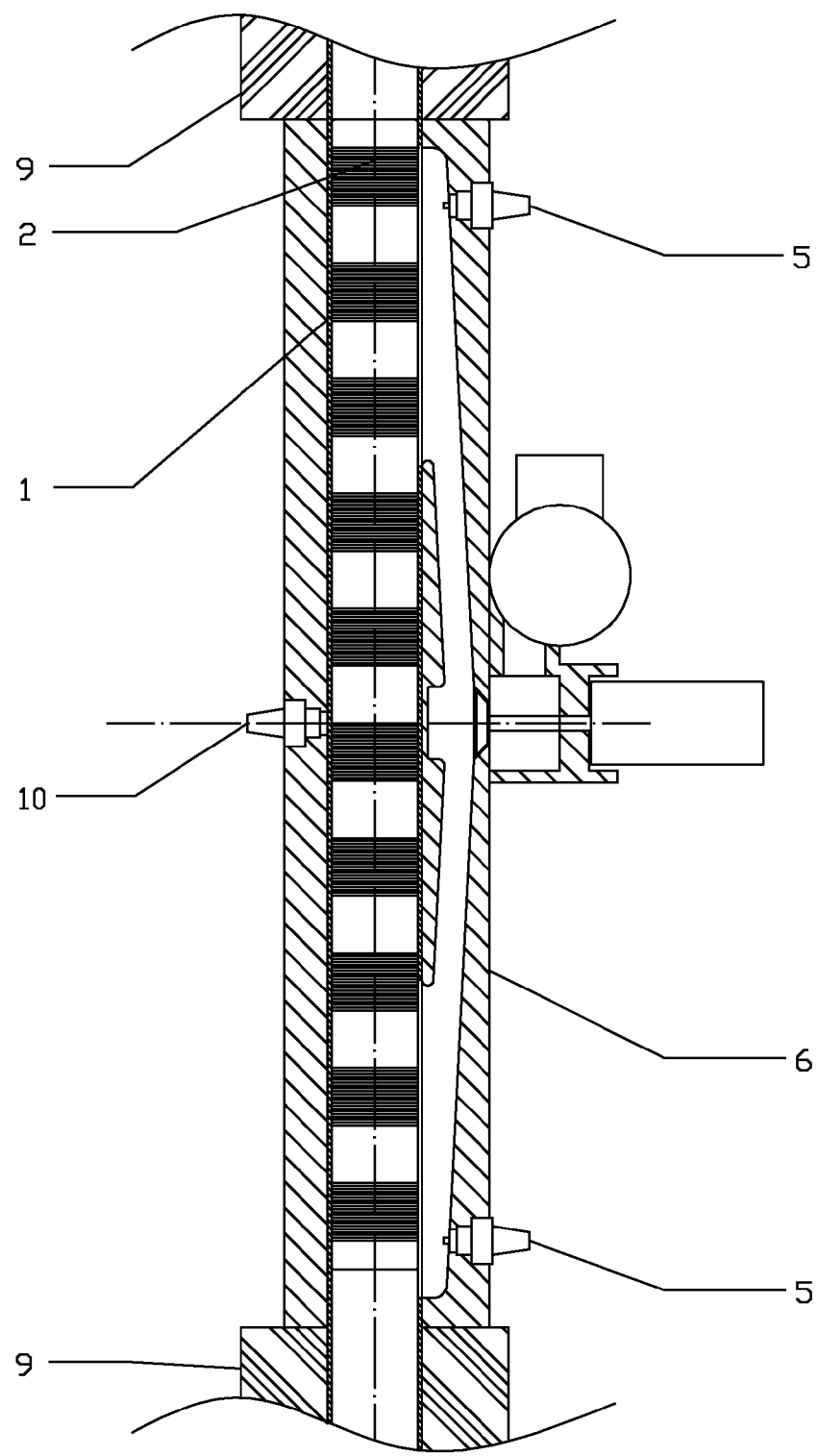
FIG. 17 is a schematic longitudinal section through a free piston engine cylinder during lubricant and/or coolant application onto the piston outer surface.

FIG. 17 shows the position of the piston 2 during lubrication (E), whereby a small quantity of lubricant and/or coolant is periodically introduced by the lubricant and coolant application means 10 directly to the piston outer surface 2a as it passes the intake sliding port valve 6a. This arrangement minimises hydrocarbon emissions associated with lubricant wetting of the cylinder inner wall, and may also reduce the extent of dissolution of fuel in the cylinder inner wall oil film. Lubrication control ring features 2e are included in the piston crown 2d to further reduce the extent of lubricant wall wetting in the first and second chambers 3, 4.

Figure 18:
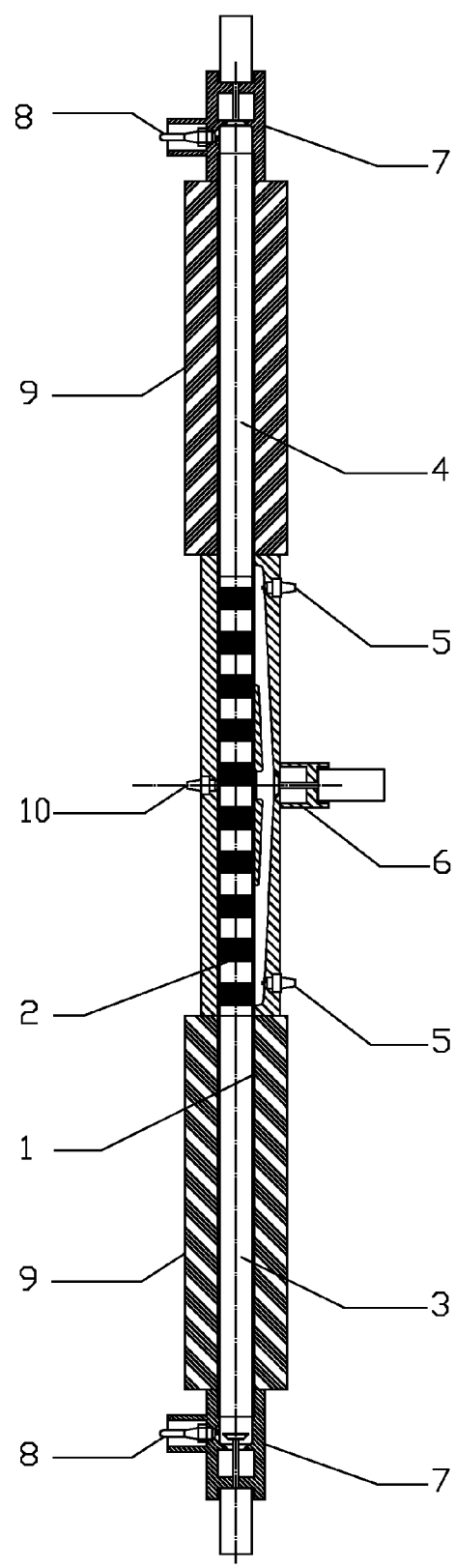
FIG. 18 is a schematic longitudinal section through a cylinder whilst the exhaust valve is open, and after the intake valve and sliding port valve have closed such that continuing expulsion of exhaust gases from the first chamber is achieved by piston displacement.

FIG. 18 shows the position of the piston 2 during the piston displacement scavenging phase EF. The intake valve 6c is closed and the expulsion of exhaust gas continues by the movement of the piston 2. The piston 2 at this time is moving towards the exhaust means 7 and reducing the volume of the first chamber 3 due to the combustion event in the second chamber 4.

As a result of the larger diameter of the exhaust valve relative to the combustion chamber diameter, the limiting area in the exhaust flow past the valve stem may approach 40% of the cylinder bore section area, resulting in low exhaust back pressure losses during both the intake charge displacement scavenging phase (DE) and piston displacement scavenging phase (EF).

Figure 19:
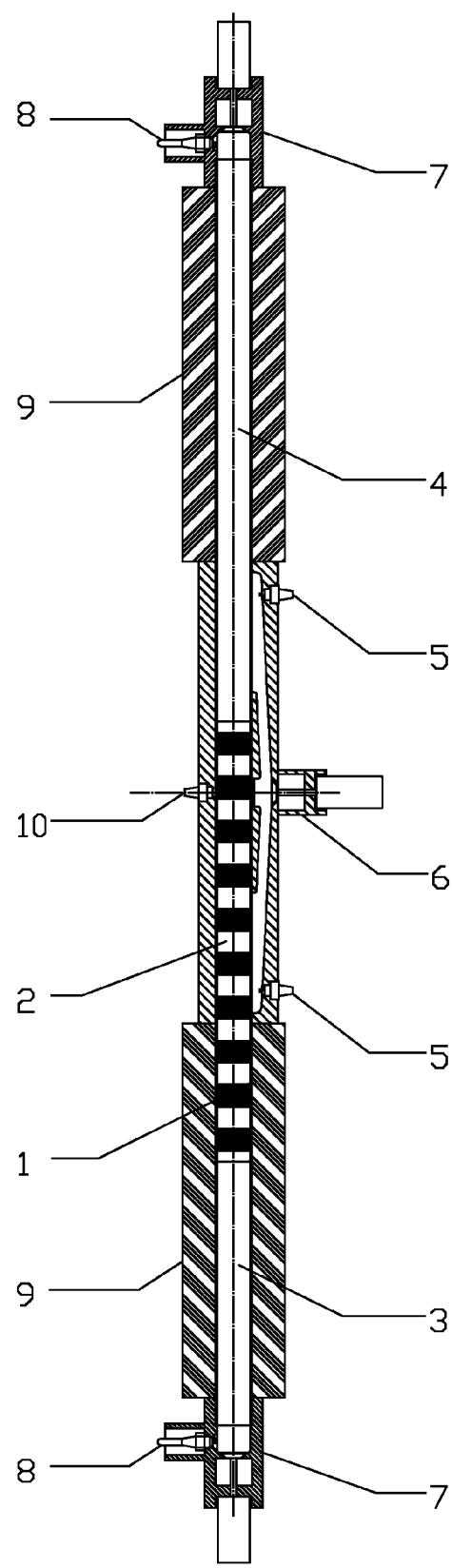
FIG. 19 is a schematic longitudinal section through a free piston engine cylinder mid way through the compression phase in the first chamber.

FIG. 19 shows a longitudinal section of the position of the piston 2 relative to the cylinder bore 1c mid-way through the compression phase (FA). When a sufficient exhaust gas expulsion has been achieved, such that the proportion of exhaust gas in the fluid in the first chamber 3 is close to the intended level, the exhaust valve 7b is closed and the compression phase (FA) begins. Compression continues at a varying rate as the piston 2 accelerates and decelerates under the action of the pressure differential between the first chamber 3 and the second chamber 4 and by the action of the electromagnetic force applied by segmented cylindrical stator 9. The pressure in the second chamber 4 is at this point falling during the expansion phases (AB and BC). The linear generator force may be modulated in order to achieve the desired compression rate to meet the engine performance, efficiency and emissions objectives. The volumetric compression rate in the first chamber 3 is substantially equal to and opposite the volumetric expansion rate in chamber 4.

Figure 20:
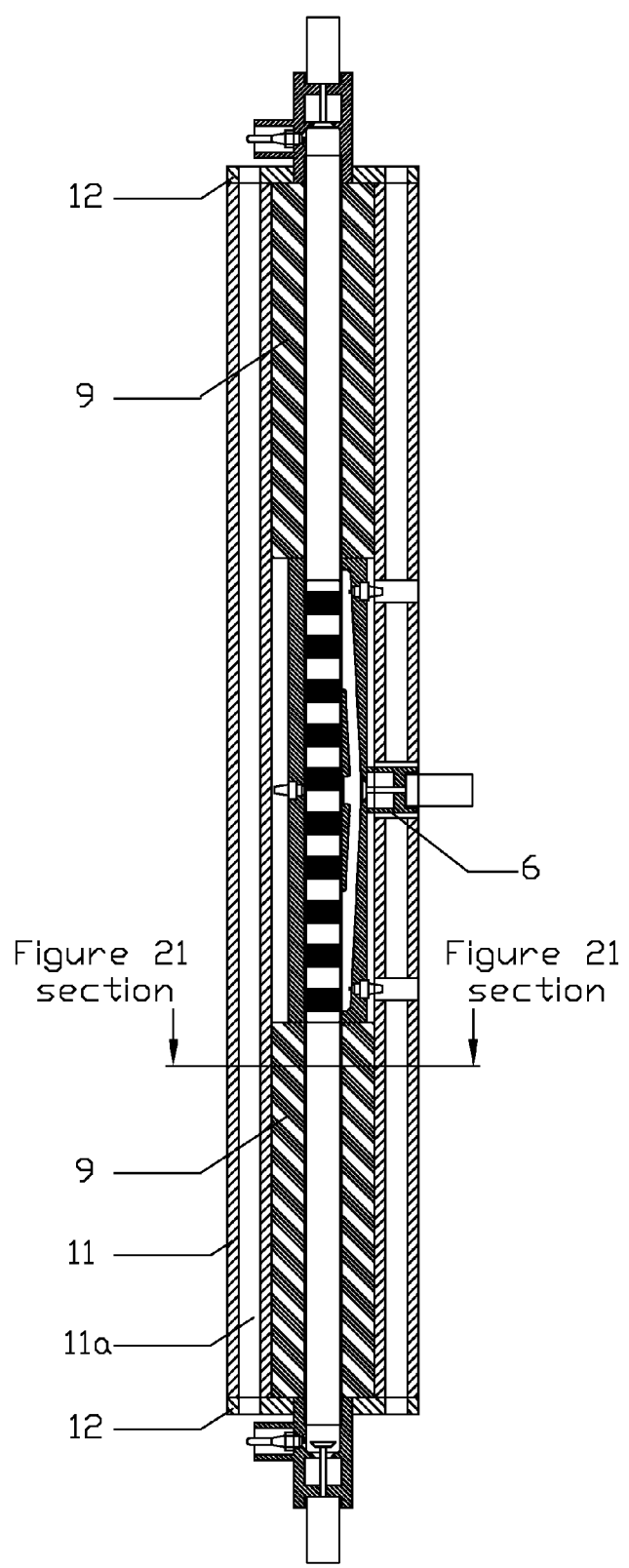
FIG. 20 is a schematic longitudinal section through a free piston engine constructed from a cylinder assembly secured within a cylinder housing by means of two clamping plates.

FIG. 20 shows a longitudinal section through a free piston engine constructed from two segmented cylindrical stators 9 and intake means 6 secured within a cylinder housing 11 by means of two clamping plates 12. The clamping plates 12 are secured to the cylinder housing 11 to apply an axial compression load to the elements contained within the cylinder housing 11.

The cylinder housing provides cooling channels 11a through which air or other cooling fluid may be passed to provide cooling means for the segmented cylindrical stators 9. Cylinder housing 11 and has an internal bore of similar dimensions to the external diameter of the segmented cylindrical stators 9 so that the cylinder housing also provides coaxial alignment of the segmented elements of the cylindrical stator 9.

Figure 21:
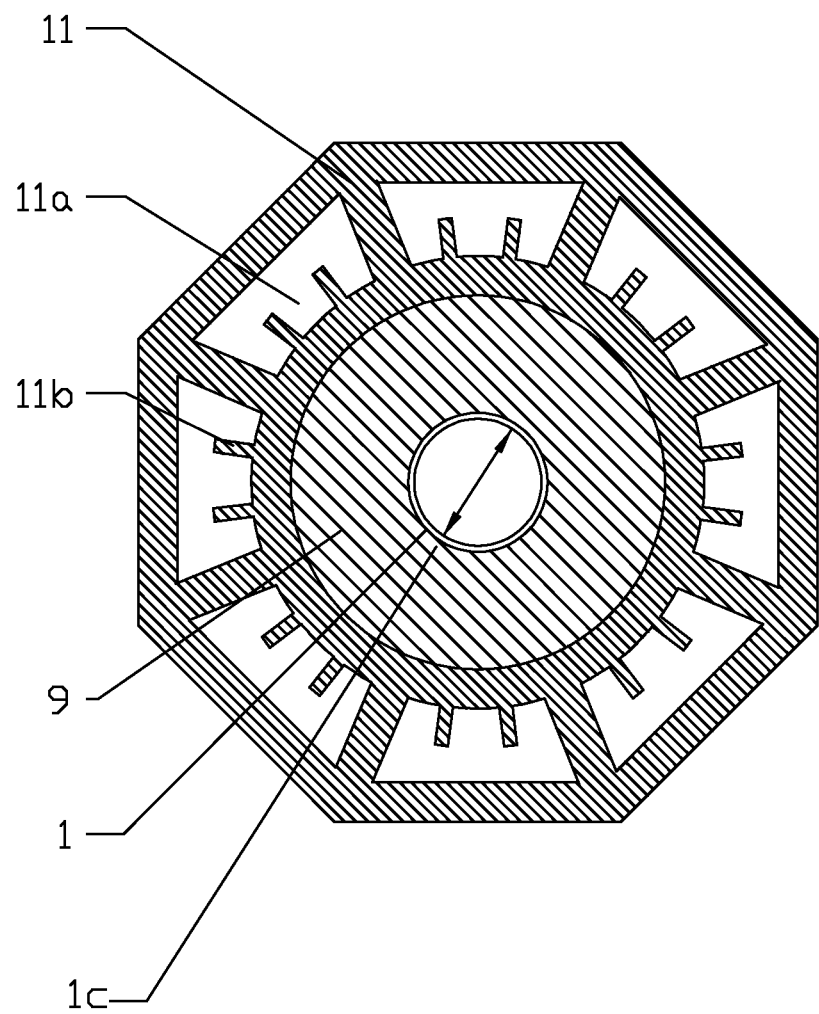
FIG. 21 is a schematic perpendicular section through a free piston engine constructed from a cylinder assembly secured within a cylinder housing, illustrating the cooling features incorporated in the cylinder housing section.

FIG. 21 shows a perpendicular section through a free piston engine having an axially segmented cylindrical stator 9 secured within a cylinder housing 11. The cylinder housing 11 in this figure, as in any of the other figures, may have a common cross section along at least a portion of its length, typically at least a third of the overall length of cylinder housing 11. By this we mean that the outline of the cross section is uniform such as may be formed by extrusion. It is noted that openings or other features may be formed in the housing without altering the common cross section. Additionally, cooling channels 11a and cooling fin features 11b may be provided to increase the heat transfer from the cylindrical stator elements housed within. The cylinder bore 1c of each segmented stator element 9c is coated with a hard material such as silicon nitride, silicon carbide or other ceramic to provide a hard wearing bearing surface for the piston 2 (see FIG. 5).

Preferably the coating material has hardness value greater than that of mild steel. For example, the commonly used mild (low carbon) steel grade ASTM A36 exhibits hardness measuring typically no greater than 180 on the Brinell hardness scale and approximately 20 on the Rockwell hardness scale.

Together the internal bore coatings on these segmented stator elements form a contiguous cylinder bore surface layer 1. This surface layer may be honed or otherwise finished once the stator elements 9c are secured in place within the cylinder housing 11 by clamping or other means. Clamping means may be provided by clamping plates 12 attached to each end of the cylinder housing 11. Alternatively, clamping may be provided by a single clamping plate 12 attached to one end of the cylinder housing 11 and applying a compressive load through the segmented cylindrical stator 9 being axially constrained by cylinder housing features or other fixing means such as adhesive bonding, compression fitting or threaded fasteners. Alternatively, the segmented cylindrical stator 9 may be secured in place within the cylinder housing 11 without the use of clamping plates 12 by other means such as adhesive bonding, compression fitting or threaded fasteners.

The invention claimed is:

1. A linear electrical machine comprising:
a piston comprising one or more elements arranged coaxially along a piston shaft,
a first axially segmented cylinder stator defining a bore therethrough along a cylinder axis and comprising at least one magnetically permeable segment, and a plurality of coils, wherein the at least one magnetically permeable segment is configured coaxially to allow the piston to reciprocate within the bore and the plurality of coils are arranged in close proximity to the piston, and wherein the coils, the at least one magnetically permeable segment and the piston elements are arranged to provide toroidal magnetic flux paths that are coaxial with the direction of travel of the piston, so that the reciprocation of the piston causes a variation of the magnetic flux within the coils;
a second axially segmented cylinder stator;
an intake means for permitting a flow of intake charge fluid, wherein the first axially segmented cylinder stator, the second axially segmented cylinder stator, and the intake means define the bore therethrough along the cylinder axis;
a cylinder housing having a cylinder bore for receiving the first axially segmented cylinder stator; and
means for securing the axially segmented cylinder stator within the housing secures the first axially segmented cylinder stator, the second axially segmented cylinder stator and the intake means within the cylinder housing by applying compression of the first axially segmented cylinder stator, the second axially segmented cylinder stator, and the intake means along the cylinder axis;
wherein the at least one magnetically permeable segment is formed from a magnetically permeable material having isotropic electrical resistivity greater than $5.0 \times 10^{-6}$ $\Omega \cdot m$ in all directions; and
wherein the means for securing the axially segmented cylinder stator within the housing comprises at least one clamping plate attached to the cylinder housing and an end of the axially segmented cylinder stator wherein the at least one clamping plate applies compression on the axially segmented cylinder stator along the cylinder axis.

2. The linear electrical machine of claim 1 wherein the cylinder bore is coated with or formed from material having hardness value greater than that of mild steel.

3. The linear electrical machine of claim 1 wherein the at least one cylinder segment has an elasticity modulus less than 10 GPa ($10 \times 10^9$ $N/m^2$).

4. A linear electrical machine of claim 1, wherein the length of the piston is at least five times its maximum diameter.

5. The linear electrical machine of claim 1, also having switching means by which the magnetic flux applied by the coils may be varied with a frequency of at least 100 Hz.

6. The linear electrical machine of claim 1 arranged within a free piston engine having a liquid spraying means that permits a coolant and/or lubricating liquid to be sprayed directly onto the piston surface.

7. The linear electrical machine of claim 1 wherein at least one of the piston elements is formed from a non-magnetising material and each element being secured such that contact is maintained between neighbouring elements.

8. A method of manufacturing a linear electrical machine according to claim 1, the method comprising:
    wherein the bore of the axially segmented cylinder stator is honed or otherwise finished after the axially segmented cylinder stator is secured in place;
    securing the axially segmented cylinder stator within the housing under compression along the cylinder axis by applying an axial tension load to the cylinder housing; and
    honing or finishing the bore of the axially segmented cylindrical stator.

9. The linear electrical machine of claim 1, wherein the at least one clamping plate comprises a first clamping plate and a second clamping plate attached to each end of the cylinder housing.

10. The linear electrical machine of claim 1, wherein the at least one clamping plate comprises a first clamping plate and a second clamping plate attached to each end of the cylinder housing and the first clamping plate engages the first axially segmented cylinder stator and the second clamping plate engages the second axially segmented cylinder stator to apply the compression to the first axially segmented cylinder stator, the second axially segmented cylinder stator, and the intake means along the cylinder axis.

11. The linear electrical machine of claim 1 wherein the cylinder housing has a uniform cross section.

12. The linear electrical machine of claim 11 wherein the cylinder housing incorporates cooling fins formed in the common cross section along at least a portion of the length of the cylinder housing.

13. The linear electrical machine of claim 1, further comprising a fastener secured to the housing, wherein the compression applied on the axially segmented cylinder along the cylindrical axis is between the at least one clamping plate and the fastener.

14. The linear electrical machine of claim 13, wherein the fastener comprises at least one of a feature of the housing, an adhesive, a compression fitting, and a threaded fastener.

15. The linear electrical machine of claim 1 further comprising a piston crown provided at one or both extremities of the piston.

16. The linear electrical machine of claim 15, wherein the piston crown is ceramic.

17. The linear electrical machine of claim 15, wherein the piston crown is concave.

18. The linear electrical machine of claim 15 wherein an exposed surface area of the piston crown is at least twice the section area of the piston, and whose exposed surface material acts as a catalyst to promote oxidation of combustion chamber contents.

19. The linear electrical machine of claim 15, wherein the piston shaft is hollow.

20. The linear electrical machine of claim 15, wherein the elements coaxially arranged on the piston shaft are formed as annular rings having the same outer diameters.

* * * * *